United States Patent
Testa et al.

(10) Patent No.: US 8,410,994 B1
(45) Date of Patent: Apr. 2, 2013

(54) SYSTEM AND METHOD FOR REMOTE GRAPHICS DISPLAY

(75) Inventors: André Testa, Laval (CA); Eric Saulnier, Pierrefonds (CA); Stéphane Tremblay, Saint-Joseph-du-Lac (CA)

(73) Assignee: Matrox Graphics Inc., Dorval, Quebec (CA)

( * ) Notice: Subject to any disclaimer, the term of this patent is extended or adjusted under 35 U.S.C. 154(b) by 247 days.

(21) Appl. No.: 12/861,796

(22) Filed: Aug. 23, 2010

(51) Int. Cl.
*G09G 5/00* (2006.01)
*A63F 13/00* (2006.01)
*A63F 9/24* (2006.01)
*G06F 17/00* (2006.01)
*G06F 19/00* (2011.01)
*G06F 15/16* (2006.01)

(52) U.S. Cl. ............ 345/1.3; 345/2.1; 345/611; 463/42; 709/208

(58) Field of Classification Search ............ 345/2.1–2.2, 345/611–615
See application file for complete search history.

(56) References Cited

U.S. PATENT DOCUMENTS

| | | | |
|---|---|---|---|
| 5,402,431 A | 3/1995 | Saadeh et al. | |
| 5,825,336 A | 10/1998 | Fujita et al. | |
| 6,366,951 B1 | 4/2002 | Schmidt | |
| 6,633,905 B1 | 10/2003 | Anderson et al. | |
| 6,732,067 B1 | 5/2004 | Powderly | |
| 6,774,904 B2 | 8/2004 | Emerson et al. | |
| 7,075,538 B2 | 7/2006 | Peacock | |
| 7,403,204 B2 | 7/2008 | Emerson et al. | |
| 7,429,991 B2 | 9/2008 | Liu et al. | |
| 7,453,465 B2 | 11/2008 | Schmieder et al. | |
| 7,486,253 B2 | 2/2009 | Kondo et al. | |
| 7,522,125 B2 | 4/2009 | Glen et al. | |
| 7,564,461 B1 | 7/2009 | Ramsey | |
| 7,567,253 B2 | 7/2009 | de Souza et al. | |
| 7,602,395 B1 | 10/2009 | Diard | |
| 7,633,461 B1 | 12/2009 | Alben et al. | |
| 7,633,483 B2 * | 12/2009 | Ben-Schachar et al. | 345/100 |
| 7,663,632 B2 | 2/2010 | Callway | |
| 7,667,707 B1 | 2/2010 | Margulis | |
| 7,734,730 B2 * | 6/2010 | McCanne | 709/219 |
| 2006/0080512 A1 | 4/2006 | Hoover et al. | |
| 2006/0282855 A1 | 12/2006 | Margulis | |
| 2007/0124474 A1 | 5/2007 | Margulis | |
| 2008/0010382 A1 * | 1/2008 | Ratakonda et al. | 709/231 |
| 2008/0209048 A1 | 8/2008 | Sampath et al. | |

(Continued)

*Primary Examiner* — Kent Chang
*Assistant Examiner* — Nathan Brittingham
(74) *Attorney, Agent, or Firm* — Anglehart et al.

(57) ABSTRACT

A method and system for displaying graphics on a display of a second module remotely connected with a first module via a data communications medium. A first controller for the first module and a second controller for the second module are connected to first and second graphics processors, respectively, both graphics processors being operative to request data from the first module when ready to process data. The first controller interfaces between the first graphics processor and the first module. The second controller interfaces between the second graphics processor and the first module via the data communications medium and the first controller. The first controller duplicates data returned to the first graphics processor by the first module in response to data requests, and transmits the duplicated data to the second controller via the data communications medium. The second controller intercepts data requests made by the second graphics processor, correlates the intercepted requests with the duplicated data received from the first controller and transmits the duplicated data to the second graphics processor on a basis of this correlation. The second graphics processor uses the received duplicated data to generate graphics for display on the display of the second module.

10 Claims, 7 Drawing Sheets

U.S. PATENT DOCUMENTS

| | | | |
|---|---|---|---|
| 2008/0287195 A1* | 11/2008 | Lee et al. | 463/42 |
| 2009/0210487 A1* | 8/2009 | Westerhoff et al. | 709/203 |
| 2009/0313392 A1 | 12/2009 | Maciesowicz | |
| 2010/0013842 A1 | 1/2010 | Green et al. | |
| 2010/0194667 A1* | 8/2010 | Lee et al. | 345/2.1 |
| 2010/0273553 A1* | 10/2010 | Zalewski | 463/31 |

* cited by examiner

SYSTEM AND METHOD FOR REMOTE GRAPHICS DISPLAY

TECHNICAL FIELD

The present invention relates generally to the field of graphics systems and more specifically to a system and method for displaying graphics on a remote display device.

BACKGROUND

These days, workplace computing environments are often characterized by a need to separate the user interface devices from the processing units. In general, the processing units process sensitive and important data that must be protected, such that the processing units are preferably maintained in an environment having specific temperature and security conditions. The user interface devices used by a user to interact with and control the processing unit(s), such as for example a display, a keyboard and a mouse, are typically remotely located from the processing unit(s) within the workplace. These user interface devices may be coupled to a personal computer or a workstation that is connected to the processing unit(s) via a data communications medium, such as a wired or wireless network connection. Accordingly, in some workplaces, users are able to use complex applications necessitating server-type systems, without having to sit in the server room that houses the processing units. Rather, the users generally sit in a location remote from the processing units.

One important problem that is difficult to overcome in this type of distributed computing environment is ensuring that the users get an accurate and real-time experience while using the user interface devices to remotely control the processing units (or servers). More specifically, a real-time graphics display at the remote display, for example in response to user commands made to the processing unit with the mouse or keyboard (e.g. open a window, open a new application, render a 3D scene, etc.), is often hampered by delays caused by network latency. Furthermore, when a processing unit or server interacts and exchanges data with remote user interface devices, the operation of the processing unit itself can easily become stalled as it waits for responses from the remote user interface devices, which can result in system-wide delays that affect not only the processing unit but the experience of the remotely-located user as well.

Many methods and systems have been developed to provide a user with a real, interactive experience when remotely displaying graphics. In one prior art system, all of the graphics rendering is done by a graphics processor on the server side, after which the rendered image is encoded and sent to the client side via a data communications medium for display at the client side. Unfortunately, the encoding and decoding (or compression and decompression) that the rendered image must undergo in this type of system leads to artifacts in the image and a loss of signal quality.

In another prior art system, a graphics processor is located only on the client side and data for rendering graphics is sent to the graphics processor from the server side via a data communications medium, such that the graphics processor can use this data to generate graphics for display at the client side. Unfortunately, in most computing environments, this type of prior art system provides long transmission delays and the latency experienced at the client side is unacceptable.

Consequently, there exists a need in the industry to provide an improved method and system for remote graphics display, such that an accurate and real-time display of the graphics is experienced by the remote user.

SUMMARY

In accordance with a broad aspect, the present invention provides a system for displaying graphics on a display of a second module remotely connected with a first module via a data communications medium. The system includes a first controller for the first module and a second controller for the second module. The first controller is adapted to be connected to a first graphics processor, the first graphics processor operative to request data from the first module when ready to process data, the first controller operative to interface between the first graphics processor and the first module. The second controller is adapted to be connected to a second graphics processor, the second graphics processor operative to request data from the first module when ready to process data, the second controller operative to interface between the second graphics processor and the first module via the data communications medium and the first controller. The first controller duplicates data returned to the first graphics processor by the first module in response to data requests, and transmits the duplicated data to the second controller via the data communications medium. The second controller intercepts data requests made by the second graphics processor and correlates the intercepted data requests with the duplicated data received from the first controller. The second controller returns the duplicated data to the second graphics processor on a basis of the correlation, the second graphics processor using the duplicated data received from the second controller to generate graphics for display on the display of the second module.

The first module may include the first controller and/or the first graphics processor, while the second module may include the second controller and/or the second graphics processor. Alternatively, the first controller and the first graphics processor may be components of a first sub-module that is external to and connected to the first module, while the second controller and the second graphics processor may be components of a second sub-module that is external to and connected to the second module. In a specific, non-limiting example of implementation of the present invention, the first module is a server module, the second module is a client module and the data communications medium is a wired network connection, such as an Ethernet network.

In accordance with another broad aspect, the present invention provides a method for displaying graphics on a display of a second module remotely connected with a first module via a data communications medium, the second module being connected to a graphics processor that is operative to request data from the first module when ready to process data. The method includes receiving at the second module data for rendering graphics from the first module via the data communications medium; intercepting data requests made by the graphics processor to the first module; correlating the intercepted data requests with the data received from the first module; and transmitting the received data to the graphics processor on a basis of the correlation, for use by the graphics processor to generate graphics for display on the display of the second module.

In a specific, non-limiting example of implementation of the present invention, the data for rendering graphics received from the first module includes an associated unique identifier, the correlating step including matching an intercepted data request with data received from the first module on a basis of the respective unique identifier.

In accordance with yet another broad aspect, the present invention provides a controller for a server module of a system for remote graphics display, the server module operative to generate data for rendering graphics and being connected to a remote client module via a data communications medium, the client module having a local display for displaying graphics. The controller is adapted to be connected to a graphics processor that is operative to request data from the server module when ready to process data. The controller is operative to interface between the graphics processor and the server module; duplicate data returned to the graphics processor by the server module in response to data requests made by the graphics processor; process the duplicated data to associated therewith a unique identifier; and transmit the duplicated data and its associated identifier to the client module via the data communications medium, for use by the client module in generating graphics for display on the local display.

In accordance with a further broad aspect, the present invention provides a controller for a client module of a system for remote graphics display, the client module adapted to be connected with a remote server module via a data communications medium and with a local display for displaying graphics, the server module operative to generate data for rendering graphics. The controller is adapted to be connected to a graphics processor, the graphics processor being operative to request data from the server module when ready to process data. The controller is operative to interface between the graphics processor and the server module via the data communications medium; intercept data requests made by the graphics processor; receive data for rendering graphics from the server module; correlate the intercepted requests with the data received from the server module; and transmit data received from the server module to the graphics processor on a basis of the correlation, the graphics processor using the data to generate graphics for display on the local display.

BRIEF DESCRIPTION OF THE DRAWINGS

The invention will be better understood by way of the following detailed description of embodiments of the invention with reference to the appended drawings, in which.

DETAILED DESCRIPTION

Figure 1:
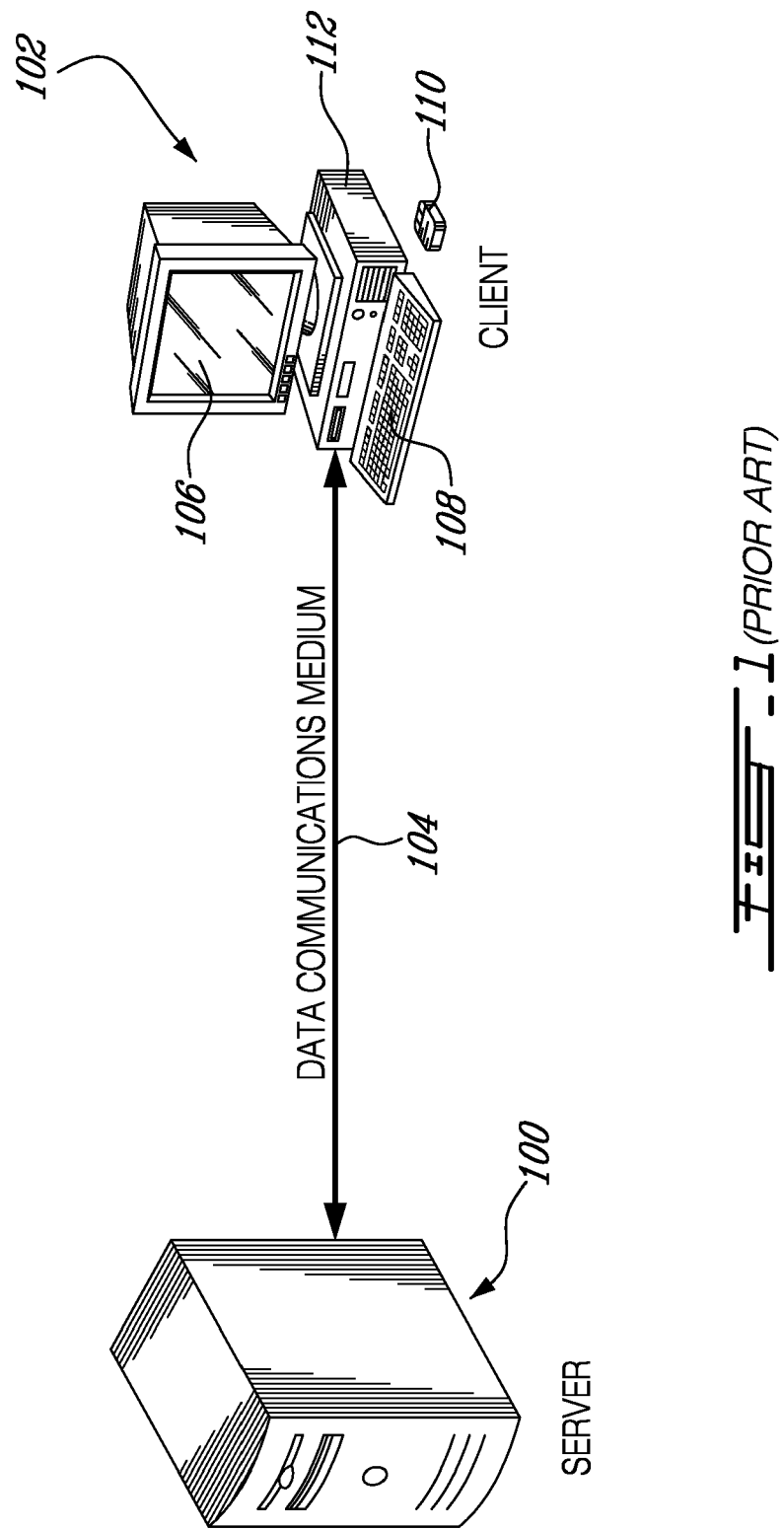
FIG. 1 illustrates a simplified system for remote graphics display, according to the prior art.

The basic principle of remote graphics display is simply illustrated in FIG. 1. A server 100 is connected to a remote client 102 via a data communications medium 104. The server 100 may be implemented by a computer, a PC system, a mainframe or a processing unit, among other possibilities. The client 102 includes a display device 106 (e.g. a monitor, a display wall, etc.) and one or more user interface devices, such as for example a keyboard 108, a pointing device 110 (e.g. a mouse, a trackball, a touchpad, etc.), game controller inputs and USB-compatible I/O devices, among other possibilities. The display device 106 and the user interface devices of the client 102 are typically coupled to a local computing unit 112, such as for example a workstation, a computer, a PC system or a thin client system, that is connected to the data communications medium 104 and that exchanges data with the server 100. The data communications medium 104 may be implemented by a network or non-network connection, which connection may be wired or wireless. An example of a wired network connection is an Ethernet connection, while an example of a wired non-network connection is a point-to-point fiber optic link.

A user at the client 102 uses the user interface devices of the client 102 to instruct the server 100 to perform specific operations and to display the results on the display device 106. These specific operations may include, for example, running a new application, opening a window or rendering a 3D scene, among many other possibilities. The server 100 performs the necessary processing and transmits data to the client 102 for displaying the results on the display device 106. Ideally, the experience by the user at the client 102 during the course of the interaction with the server 100 is real-time and accurate, without any noticeable delays or system latency; however, this is dependent on the type of data communications medium 104, the processing capabilities of both the server 100 and the computing unit 112 of the client 102, as well as the exchange of data that takes place between the server 100 and the client 102.

In the context of the present specification, the terms "server" and "server module" are used interchangeably and refer to a computing module that provides a function or service to one or many clients. Also, the terms "client" and "client module" are used interchangeably and refer to a computing module that relies on a server to fulfill its computational role. A "server" therefore shares its resources with clients, while a "client" depends on a server's content or service functions. The client-server structure or model is applicable to any computer system architecture, including both network and non-network environments. Thus, the server and its clients may take the form of separate hardware communicating over a computer network or, alternatively, may reside in the same computer system, among other possibilities.

Furthermore, in the context of the present specification, the terms "graphic", "graphics", "graphics image" and "image" are used interchangeably and broadly refer to a visual presentation or representation that can be displayed on a display, such as a computer monitor or screen. In contrast, "data for rendering graphics" refers to any data that may be used by a processing unit, such as a graphics processor or accelerator, to generate the graphics or image. This data may include graphics commands, pixel data (e.g. a group of pixels used in images, bitmaps, textures and fonts, among other possibilities) and vectors (i.e. mathematical formulas), among many other possibilities.

The present invention is directed to a novel system and method for remote graphics display or, more specifically, for displaying graphics on a display of a second module remotely connected with a first module via a data communications medium, where the first and second modules are connected to first and second graphics processors, respectively. Basically, first and second controllers interface between the first module and the first and second graphics processors, respectively. These controllers cooperate with one another via the data communications medium to ensure that the operations of the second graphics processor mirror those of the first graphics processor while the first module remains completely unaware of the existence of the second graphics processor. Since the two graphics processors are mirrored, it is possible to use the first graphics processor to predict the data that will be required by the second graphics processor and to send this required data before it has actually been requested, thus reducing system latency and providing a real-time display experience at the second module.

Figure 2:
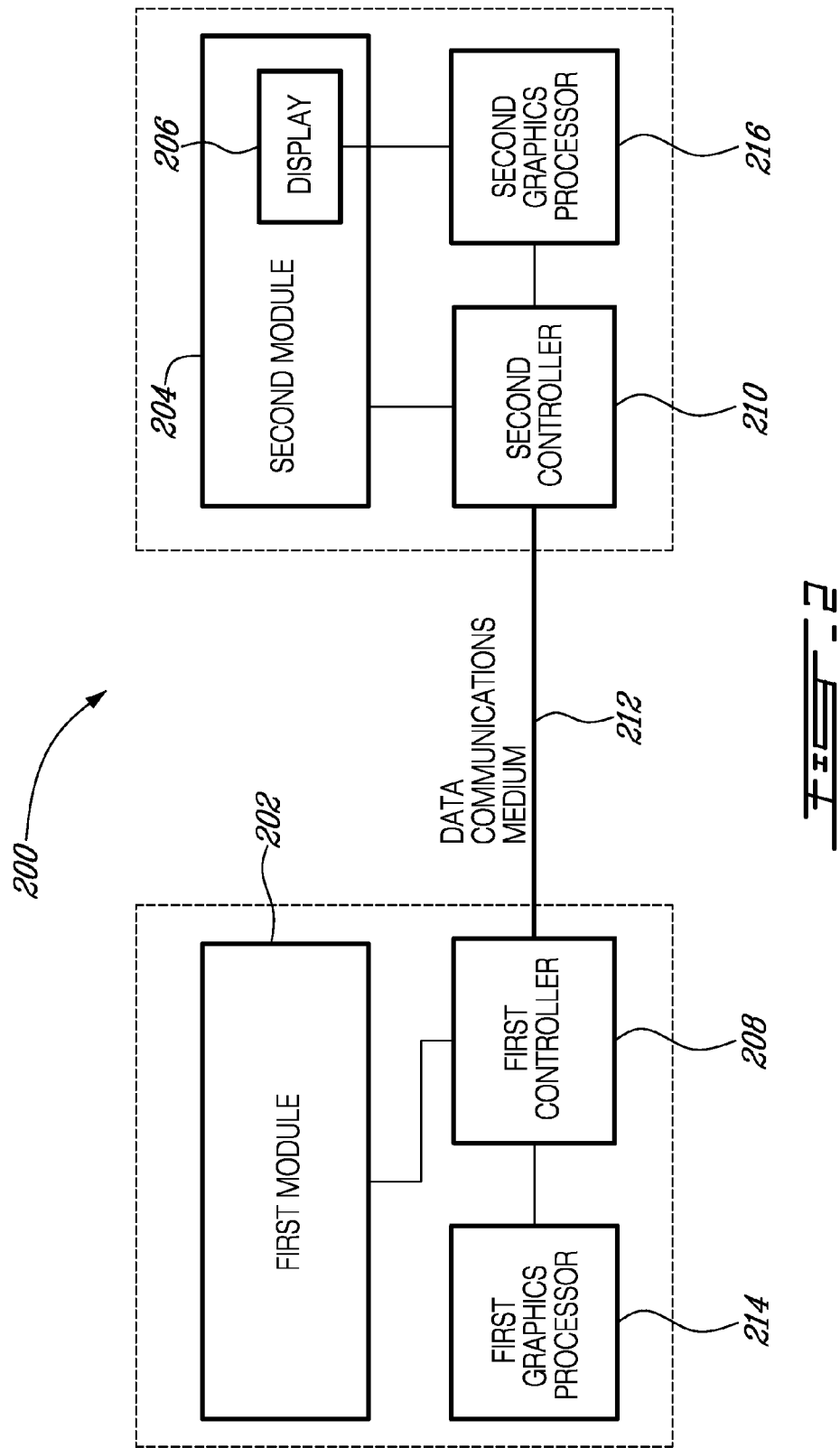
FIG. 2 is a block diagram of a system for remote graphics display, according to an embodiment of the present invention.

FIG. 2 is a block diagram of a system 200 for remote graphics display, according to a non-limiting embodiment of the present invention. A first module 202 is operative to display graphics on at least one display device 206 (also referred to herein as a display 206) of a second module 204, the second module 204 being remotely connected to the first module 202 via a data communications medium 212. The first and second modules 202, 204 use first and second graphics processors 214, 216, respectively, to process data for rendering graphics. Although not shown in FIG. 2, the second module 204 is associated with one or more user interface devices, such as a keyboard or a mouse, whereby a user at the second module 204 can instruct the first module 202 to perform a specific function or to provide a specific service.

The first module 202 is a computing module with the processing capability to generate data for rendering graphics, such as graphics commands. This first module 202 may take the form of a processing unit (e.g. a central processing unit or CPU), a computer, a laptop, a PC system, a server system or a server machine, among other possibilities. The second module 204 is also a computing module, but one that may have less processing capability than the first module 202. The second module 204 may take the form of a processing unit, a computer, a laptop, a light PC, a PC system, a workstation, a client machine or a display, among other possibilities. The display device 206 is coupled to the second module 204 and may be an internal or integral component of the second module 204 or, alternatively, a separate component external to the second module 204. This display device 206 may take the form of a monitor, a screen, a TV/HDTV display or a display wall, among other possibilities.

The first and second graphics processors 214, 216 (also referred to herein as graphics processing units, GPUs or graphics accelerators) are operative to process data in a plurality of formats, for generating images or graphics in one or more formats. In a specific, non-limiting example, the graphics processors 214, 216 may produce one or more PC graphics video outputs (e.g. a DVI output or an RGB output) for transmission to the display device 206. Various different types, designs and manufactures of graphics processors 214, 216 are possible and may be used without departing from the scope of the present invention.

Note that the first and second graphics processors 214, 216 may be internal or integral components of the first and second modules 202, 204, respectively. Alternatively, the first and second graphics processors 214, 216 may be separate components, external to the first and second modules 202, 204, respectively.

The data communications medium 212 is operative to transmit data back and forth between the first and second modules 202, 204 and their associated components. This data communications medium 212 can take any one of many possible different forms, including wired and wireless connections, as well as network and non-network connections. The data communications medium 212 is characterized by a predefined communications protocol, which must be supported by both the first and second controllers 208, 210 and their associated components. In a non-limiting embodiment of the invention, the predefined communications protocol is "reliable", in that it provides for tracking of data exchanged between the controllers 208, 210, thereby allowing for data re-transmission in case of data corruption or lost data. Although many communications protocols are designed with built-in reliability, it is also possible to use a communications protocol that does not have built-in reliability, in which case a custom-made mechanism or algorithm must be implemented or added to the protocol in order to provide for the necessary reliability. Various different predefined communications protocols are possible, from industry standard protocols to custom-made protocols, including for example Universal Serial Bus (USB), Peripheral Component Interconnect Express (PCIe or PCI-E), Ethernet and Serial Advanced Technology Attachment (SATA), among many other possibilities.

Specific to the present invention, the first and second graphics processors 214, 216 are identically initialized at system start-up and are each operative to request data for rendering graphics from the first module 202 when ready to process data, where this data may include graphics commands, vertices, textures, bitmaps, fonts and video surfaces, among other possibilities. This type of operation by a graphics processor, whereby data is only sent to the graphics processor in response to its requests for data, is characteristic of the "pull mode" of a graphics processor, which will be discussed in further detail below.

A first controller 208 associated with the first module 202 interfaces between the first module 202 and the first graphics processor 214, while a second controller 210 associated with the second module 204 interfaces between the second graphics processor 216 and the first module 202, via the data communications medium 212 and the first controller 208. Thus, the first and second controllers 208, 210, which are interconnected by the data communications medium 212, act as the gateways for data exchange between the first and second modules 202, 204. More specifically, the first and second controllers 208, 210 control the exchange of data between the first and second modules 202, 204, and thus to and from the first and second graphics processors 214, 216, such as to ensure that the second graphics processor 216 mirrors the operations of the first graphics processor 214 without the first module 202 ever becoming aware of the existence of the second graphics processor 216.

The first and second controllers 208, 210 may be implemented in hardware (e.g. control circuitry), software or a combination of both, without departing from the scope of the present invention. In a specific, non-limiting example of implementation, the first and second controllers 208, 210 are implemented by integrated circuits, in the form of field-programmable gate arrays (FPGAs).

Note that, as in the case of the graphics processors 214, 216, the first and second controllers 208, 210 may be internal or integral components of the first and second modules 202, 204, respectively. Alternatively, the first and second controllers 208, 210 may be separate components, external to the first and second modules 202, 204, respectively. It is also possible that the first graphics processor 214 and the first controller 208 are implemented together in a first standalone sub-module that is external to and connected to the first module 202, while the second graphics processor 216 and the second controller 210 are implemented together in a second standalone sub-module that is external to and connected to the second module 204.

In operation, when the first graphics processor 214 is ready to process data and requests data from the first module 202, the first controller 208 is operative to duplicate the data returned to the first graphics processor 214 by the first module 202 and to transmit this duplicated data to the second controller 210 over the data communications medium 212. When the second graphics processor 216 is ready to process data and requests data from the first module 202, the second controller 210 is operative to intercept these data requests made by the second graphics processor 216 and to block them, such that the data requests of the second graphics processor 216 are never transmitted to nor received by the first module 202. The second controller 210 is also operative to correlate the intercepted data requests from the second graphics processor 216 with the duplicated data received from the first controller 208 and, on a basis of this correlation, to transmit the duplicated data to the second graphics processor 216. The second graphics processor 216 uses the duplicated data received from the second controller 210 to generate graphics for display on the display 206.

The duplication operations by the first controller 208, combined with the interception and correlation operations by the second controller 210, allow for the second graphics processor 216 to mirror the first graphics processor 214 unbeknownst to the first module 202, which is only aware of the first graphics processor 214. Advantageously, this reduces system latency and provides for a real-time and accurate display experience at the second module 204.

Figure 4:
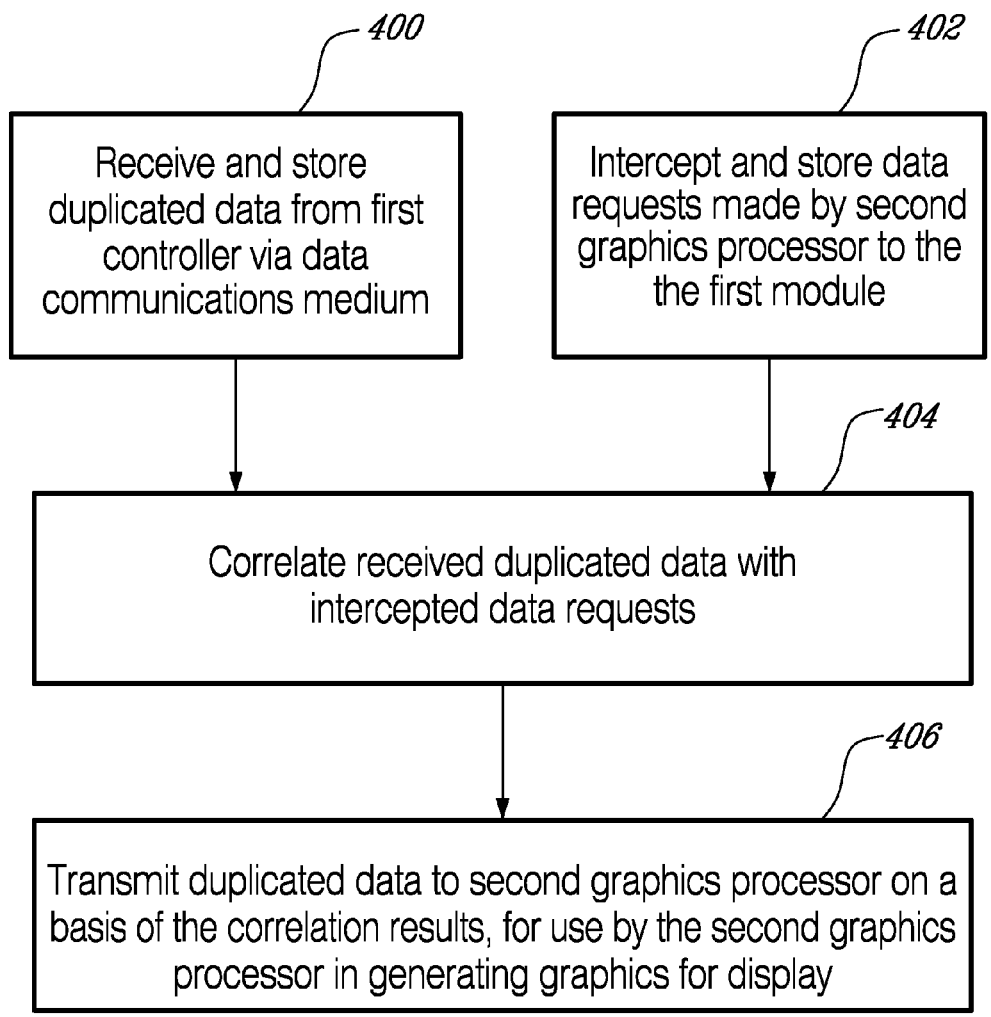
FIG. 4 is a flow diagram of a process implemented by the second controller of FIG. 2, according to a non-limiting example of implementation of the present invention.

FIG. 4 is a flow diagram illustrating the processing implemented by the second controller 210, according to a non-limiting example of implementation of the present invention. At step 400, the second controller 210 receives and stores duplicated data from the first controller 208 via the data communications medium 212. At step 402, data requests made by the second graphics processor 216 to the first module 202 are intercepted and stored, such that the first module 202 never receives these data requests. At step 404, the intercepted data requests are correlated with the duplicated data received from the first controller 208. At step 406, duplicated data is transmitted to the second graphics processor 216 on a basis of the results of this correlation, the second graphics processor using the duplicated data to generate (or render) graphics for the display 206 of the second module 204.

Figure 3:
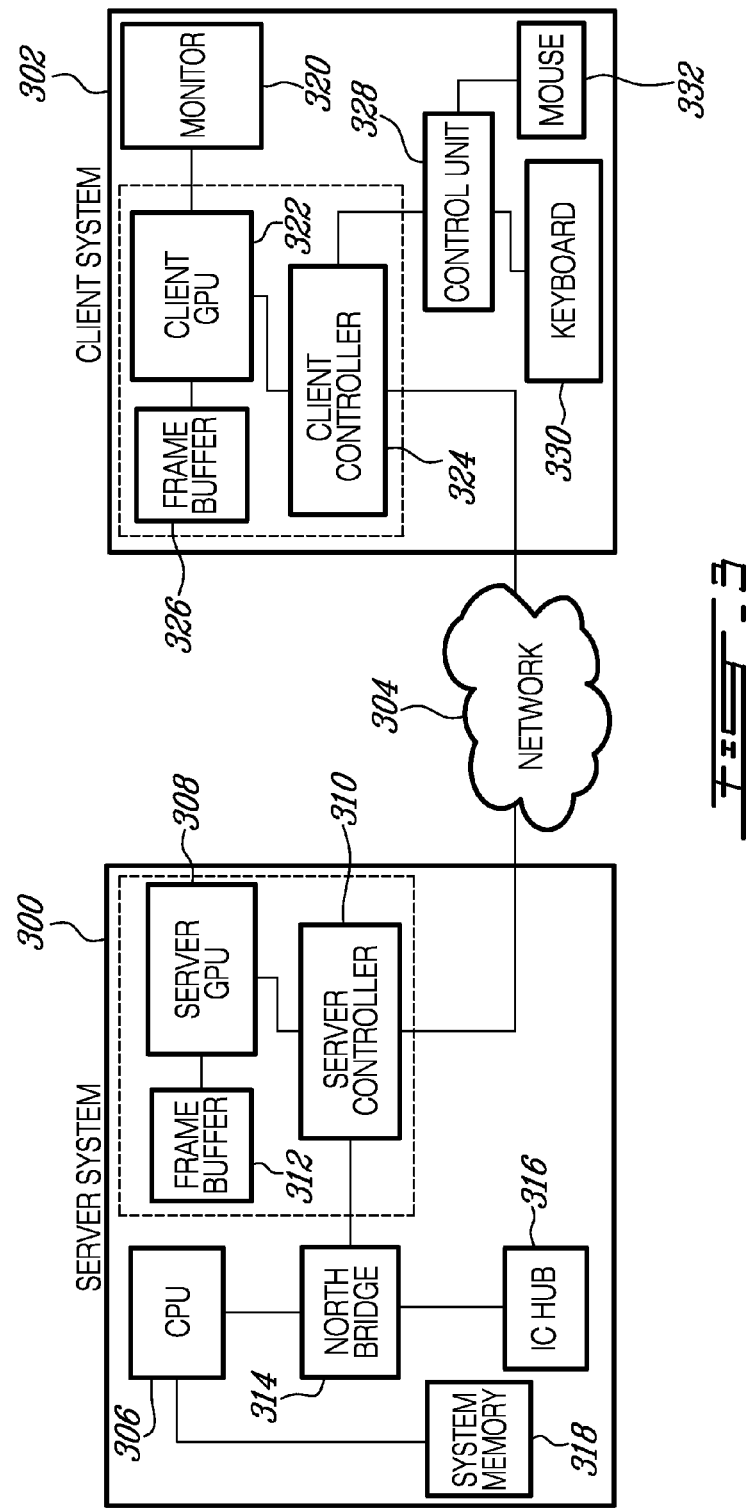
FIG. 3 illustrates a client-server system for remote graphics display, according to a non-limiting example of implementation of the present invention.

In a specific, non-limiting example of implementation of the present invention, the system for remote graphics display is a client-server system, as shown in FIG. 3. The server system 300 and the client system 302 are interconnected by a data communications network 304, such as for example an Ethernet network. The server system 300 includes a central processing unit (CPU) 306 and a northbridge 314, the latter handling the communications between the CPU 306, and an input/output controller (IC) hub 316. The server system 300 also includes a server GPU 308 connected to a local frame buffer 312, the latter used for storage of data in the course of the graphical processing operations by the GPU 308. Specific to an embodiment of the present invention, the server system 300 includes a server controller 310 that interfaces between the server GPU 308 and the CPU 306 via the northbridge 314.

In the example of implementation shown in FIG. 3, the client system 302 includes a monitor or display 320 and a control unit 328 for controlling user interface devices, for example keyboard 330 and mouse 332. The client system 302 also includes a client GPU 322 connected to a local frame buffer 326, the latter used for storage of data in the course of the graphical processing operations by the GPU 322. Specific to an embodiment of the present invention, the client system 302 includes a client controller 324 that interfaces between the client GPU 322 and the CPU 306 via the network 304 and the server controller 310.

A GPU may operate in a pull or a push mode, as determined by the driver of the GPU. Some GPUs may even support both modes, in which case the driver may switch between the pull mode and the push mode. When operating in the push mode (also referred to as the slave mode), data (e.g. graphics or drawing commands) is sent to the GPU by the CPU and extra synchronization is required to ensure that the GPU is ready to receive the incoming data and is not busy processing previously received data. When a GPU is operating in pull mode (also referred to as bus mastering mode), it fetches its data (e.g. graphics or drawing commands) whenever it is ready to process data. The pull mode is more efficient, since the GPU requests data when ready instead of becoming idle and waiting for data to arrive, such that no synchronization is required.

Specific to the present invention, both the server GPU 308 and the client GPU 322 are adapted to operate in pull mode, whereby they request data from the server system 300 when they are ready to process data. Furthermore, at the time of system boot up, the server GPU 308 and the client GPU 322 are identically initialized.

In operation, a user at the client system 302 may send requests to the server system 300 using the user interface devices (keyboard 330 and mouse 332), via the control unit 328 and the network 304. The server system 300 receives these requests and the CPU 306 processes them. If a request contains a new display instruction, the CPU 306 generates and stores a respective programming sequence of graphics commands in the system memory 318. The CPU 306 then sends a notification to the server GPU 308 via the server controller 310, in order to advise the server GPU 308 that this programming sequence is ready to be processed. In a specific, non-limiting example, this notification includes a location of the graphics commands in system memory 318 (e.g. a memory address) and a quantity of data to be fetched, among other possible parameters. The server controller 310 duplicates the notification received from the CPU 306 and forwards it to the client controller 324 via the network 304, for processing by the client GPU 322. Both the server GPU 308 and the client GPU 322 then begin fetching the graphics commands, on a basis of the parameters of the notification, by sending requests for data to the CPU 306 targeting the system memory 318 of the server system 300.

Note that the requests for data sent by the server GPU 308 or the client GPU 322 to the CPU 306 of the server system 300 may occur while the respective GPU is processing graphics commands for generating an image.

Within the server system 300, when the CPU 306 returns data to the server GPU 308 in response to one of its data requests, the server controller 310 duplicates this data and forwards it to the client controller 324 via the network 304.

Within the client system 302, when the client GPU 322 sends a data request to the CPU 306, the client controller 324 intercepts this data request and prevents it from being transmitted to the CPU 306. The client controller 324 correlates the intercepted data request with duplicated data received from the server controller 310 and, on a basis of this correlation, returns the corresponding duplicated data to the client GPU 322. The client GPU 322 uses the duplicated data received from the client controller 324 to generate graphics or images for display on the monitor 320 of the client system 302.

Note that, since the server GPU 308 and the client GPU 322 are mirrored, they should technically generate the exact same data requests for fetching data (e.g. graphics commands) from the system memory 318, according to the same order.

However, although the mirrored GPUs 308 and 322 receive the same programming, the timeline is different between the two GPUs because of network delays and re-ordering, as well as client processing time. More specifically, notifications from the CPU 306 may not arrive with the same timing at server GPU 308 as they do at client GPU 322, thus creating a request order mismatch between the GPU 308 and the GPU 322. Furthermore, although a typical northbridge interface (e.g. PCI Express) uses a tag field attached to each request and any data returned by the CPU 306 in response to a data request from the server GPU 308 will include a tag associating the returned data with its corresponding data request, the association is based on the order in which the data request was received from the server GPU 308. As such, these same tags can not be used by the client controller 324 to match up duplicated data received from the server controller 310 with intercepted data requests from the client GPU 322.

Accordingly, within the server system 300, when the server controller 310 is duplicating data for forwarding to the client controller 324, the server controller 310 is operative to make a copy of the data and to process the copied data in order to associate therewith a unique identifier. This unique identifier relates or ties the duplicated (or copied) data to its corresponding data request from the server GPU 308, independently of the order in which the data request was received. The server controller 310 then transmits both the duplicated data and its associated identifier to the client controller 324. In one example, the associated identifier is appended to the duplicated data, for example in a header field, and transmitted integrally with the duplicated data. Alternatively, the associated identifier may be transmitted separately from the duplicated data.

In a specific, non-limiting example, the unique identifier is a memory address that corresponds to the location in system memory 318 of the data requested by the server GPU 308. Thus, the server controller 310 includes and maintains a tag-to-address table for the data requests made by the server GPU 308 to the CPU 306, where this tag-to-address table associates data tags to memory addresses. Upon duplication of data returned by the CPU 306, the server controller 310 is operative to look up in its tag-to-address table the memory address that corresponds to the respective data tag, and to associate this address with the duplicated data, possibly by appending the address to the duplicated data.

Within the client system 302, the client controller 324 is operative to temporarily store both the intercepted data requests from the client GPU 322 and the duplicated data received from the server controller 310 in respective local storage mediums (e.g. a cache or a queue), since there may be order mismatch and delays between receipt of the data requests from the client GPU 322 and receipt of the data from the server controller 310. The client controller 324 correlates intercepted data requests from the client GPU 322 with the duplicated data received from the server controller 310 by matching a particular intercepted data request with particular duplicated data, on a basis of the unique identifier associated with the particular duplicated data. Thus, taking for example the case where the unique identifier is a memory address, the client controller 324 will compare the address parameter of an intercepted data request with the addresses appended to the duplicated data elements received from the server controller 310 and, when a match is found, will forward the respective duplicated data element to the client GPU 322 for graphics rendering.

In a specific, non-limiting example, the client controller 324 includes a cache for storing the duplicated data received from the server controller 310 and a queue for storing the intercepted data requests from the client GPU 322. The cache is sufficiently large to store a predetermined quantity of data, in order to account for the most possible request ordering mismatches between the data requests from the client GPU 322 and the data received from the server controller 310. The determination of the most possible request ordering mismatches that can occur may be calculated on a basis of the design and implementation details of the client GPU 322. Alternatively, this determination can be made using a trial and error method, by running test programming sequences of graphics commands through the server and client GPUs 308, 322 and monitoring the request ordering mismatches that occur during processing. In one example, the cache can store up to 256×64 bytes of data; however, the cache of the client controller 324 can be adapted to store more or less data than this without departing from the scope of the present invention.

In addition to potentially causing request order mismatches, the network delays within the client-server system of FIG. 3 may also cause the two GPUs 308, 322 to make requests for data of different formats. For example, GPU 308 may make a single data request for 128 bytes of data at address X, while GPU 322 may make two data requests, one for 64 bytes of data at address X and the other for 64 bytes of data at address X+64 bytes. Accordingly, in a variant example of implementation of the present invention, the client controller 324 is also adapted to compensate for request mismatches between the GPU 308 and the GPU 322 based on differing data formats. More specifically, the duplicated data received by the client controller 324 from the server controller 310 is broken down into its smallest possible length and stored as one or more chunks of data in the dedicated local cache of the client controller 324. Thus, assuming for example that the smallest possible data size that can be requested by the GPUs 308, 322 is 32 bytes, the client controller 324 is operative to process any incoming data from the server controller 310 such as to store it in 32-byte chunks in its local cache. Accordingly, regardless of any disparity between the size of the duplicated data received from the server controller 310 and the size of the data requested by the GPU 322, the client controller 324 will be able to return data to the GPU 322 in the appropriate size.

Furthermore, in another variant example of implementation of the present invention, the GPUs 308 and 322 are adapted to randomly perform prefetching. The prefetching capability of a GPU allows the GPU to issue extra data requests in the eventuality that subsequent data requests (e.g. subsequent graphics commands) may need the extra data. Since with prefetching the two mirrored GPUs 308 and 322 do not always request the same amount of data from the CPU 306, the client controller 324 must be able to compensate for any prefetching done by either the server GPU 308 or the client GPU 322. More specifically, the client controller 324 needs to identify which data received from the server controller 310 is in fact a result of prefetching by the GPU 308 and therefore should be removed from its local cache, as well as which data requests made by the GPU 322 are a result of prefetching by the GPU 322. Accordingly, in a specific, non-limiting example, the client controller 324 compensates for prefetching by the server GPU 308 by evicting data received from the server controller 310 from its local cache if a predefined quantity of more recent data has been successfully associated with corresponding data requests intercepted from the GPU 322. The client controller 324 also compensates for prefetching by the client GPU 322 by generating dummy data in response to a particular data request intercepted from the GPU 322, when a predefined number of more recent data requests intercepted from the GPU 322 have been successfully associated with corresponding data received from the server controller 310. For example, in order to deal with prefetching by the server GPU 308, the client controller 324 will evict a data element (e.g. a graphics command) from its local cache if 256 more recent data elements have been matched with data requests from the GPU 322. In another example, in order to deal with prefetching by the client GPU 322, the client controller 324 will evict a data request by the GPU 322 from its local queue if 256 more recent data requests by the GPU 322 have been matched with corresponding data from the server controller 310. Obviously, the predefined threshold(s) that determine(s) when the client controller 324 evicts data from its local cache or data requests from its local queue may vary without departing from the scope of the present invention.

Figure 7:
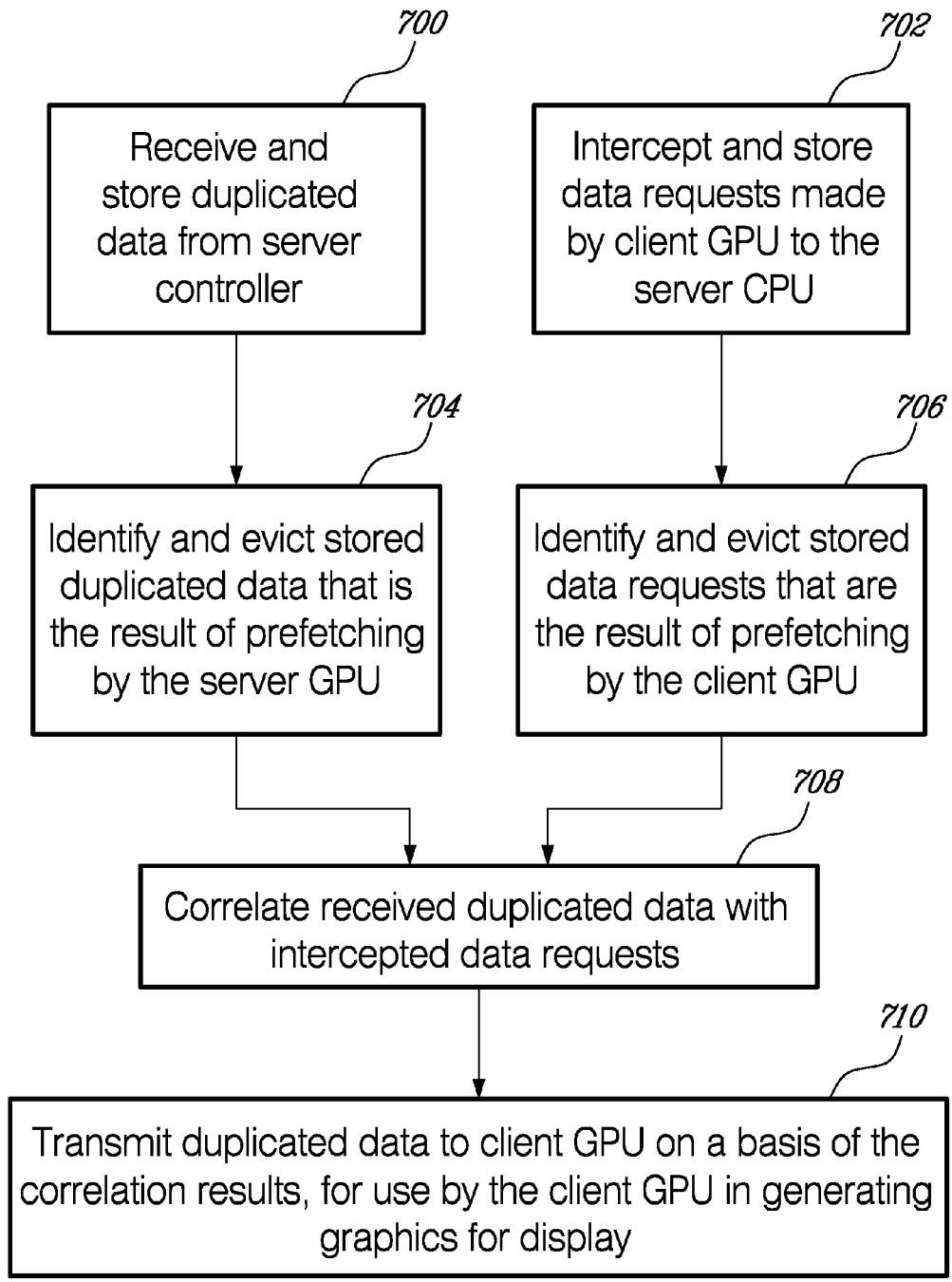
FIG. 7 is a flow diagram of a process implemented by the client controller of FIG. 3, according to a non-limiting example of implementation of the present invention.

FIG. 7 is a flow diagram illustrating the processing implemented by the client controller 324 with compensation for prefetching by the server and client GPUs 308, 322, according to a non-limiting example of implementation of the present invention. At step 700, the client controller 324 receives and stores duplicated data from the server controller 310. At step 702, data requests made by the client GPU 322 to the server CPU 306 are intercepted and stored, such that the server CPU 306 never receives these data requests. At step 704, the client controller 324 identifies and evicts stored duplicated data from the server controller 310 that is the result of prefetching by the server GPU 308. At step 706, the client controller 324 identifies and evicts stored data requests from the client GPU 322 that are the result of prefetching by the client GPU 322. At step 708, the intercepted data requests are correlated with the duplicated data received from the server controller 310. At step 710, duplicated data is transmitted to the client GPU 322 on a basis of the results of this correlation, the client GPU 322 using the duplicated data to generate (or render) graphics for the monitor 320 of the client system 302.

Figure 5:
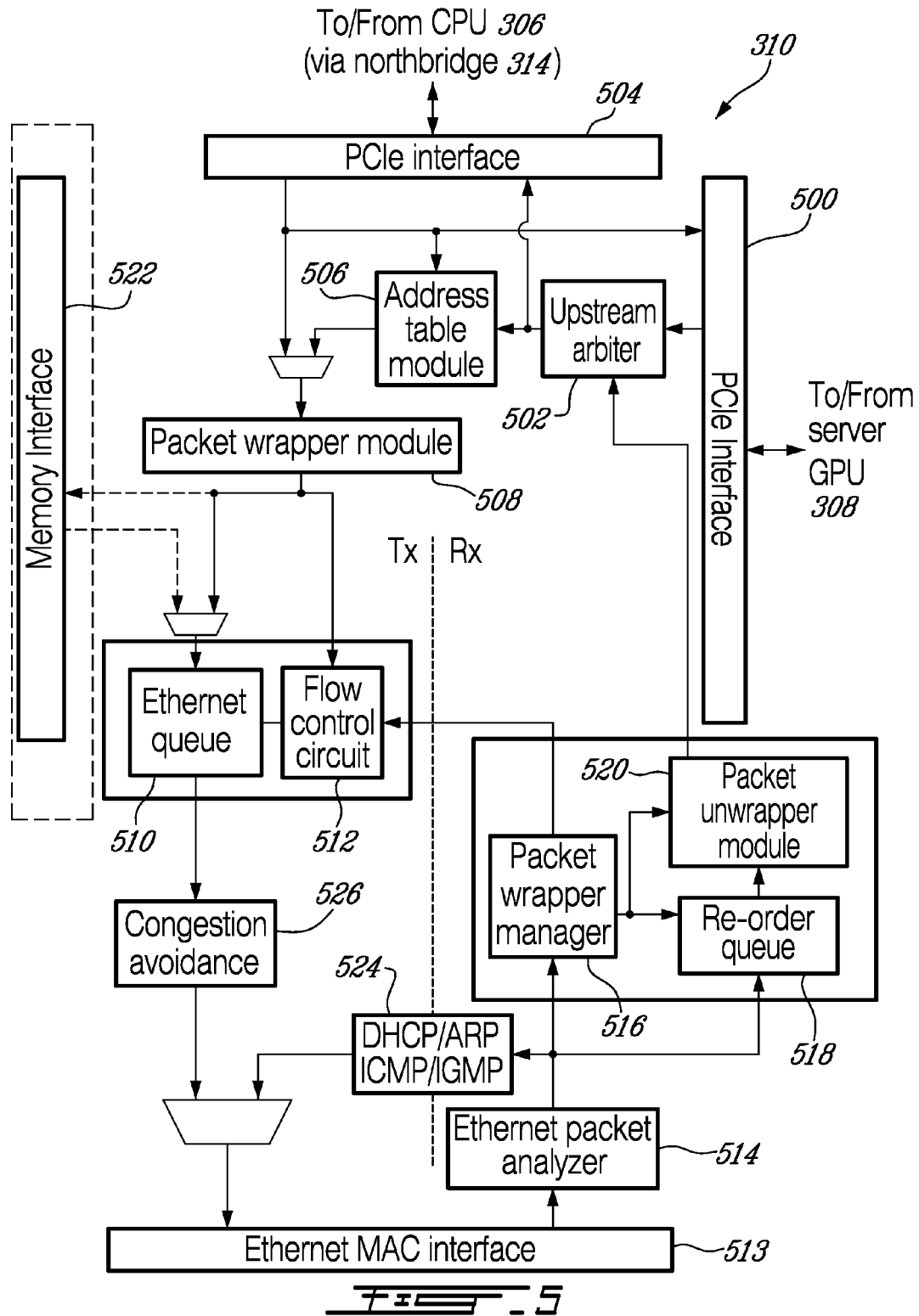
FIG. 5 is a schematic representation of the server controller shown in FIG. 3, according to a non-limiting example of implementation of the present invention.

FIG. 5 is a simplified block diagram of the server controller 310 of the server system 300, according to a non-limiting example of implementation of the present invention. When the server GPU 308 sends a data request to the CPU 306, the server controller 310 receives the data request via the PCIe interface 500. An upstream arbiter 502 arbitrates the data requests received from the server GPU 308 with the Ethernet data being sent out to the CPU 306 via the PCIe interface 504, as will be discussed further below. The upstream arbiter 502 passes each received data request to an address table module 506, which processes each data request in order to extract, associate and store the request address with its corresponding tag (for use upon processing the data (e.g. graphics command) received from the CPU 306 in response to the respective data request before transferring this data to the Ethernet path for transmission to the client system 302). Once the respective address information has been logged by the address table module 506, each data request is passed to the PCIe interface 504 for forwarding to the CPU 306 via the northbridge 314.

When the server controller 310 receives data (e.g. read commands, write commands or graphics commands) from the CPU 306 via the PCIe interface 504, the latter forwards this data to both the PCIe interface 500 (for transmission to the server GPU 308) and to a packet wrapper module 508 (for transmission to the Ethernet bus or network 304). In the case of data being sent by the CPU 306 in response to a data request from the server GPU 308, the data received by the PCIe interface 504 is passed to the address table module 506, such that a unique identifier in the form of the request address can be appended to the data before this data is passed to the packet wrapper module 508.

The packet wrapper module 508 is operative to generate size optimal packets, since PCIe packets are typically a lot smaller than Ethernet packets. Accordingly, in order to increase efficiency, the packet wrapper module 508 "packs" several PCIe packets together within a single Ethernet packet (or frame). The packet wrapper module 508 is also operative to add a reliability and flow control header to each Ethernet packet before sending this frame into an Ethernet queue 510 for bus transmission. The addition of a reliability and flow control header to each Ethernet packet provides a means for the server system 300 to track if transmitted data gets lost before reaching its intended destination (e.g. the client system 302 can, on a basis of the reliability and flow control headers of the received Ethernet packets, notify the server system 300 if a packet transmitted by the server system 300 to the client system 302 was never received). The packet wrapper module 508 may also apply some form of compression to the Ethernet packets before releasing them to the queue 510 for bus transmission, in order to reduce data storage volume and bandwidth requirements. Preferably, the compression algorithm implemented by the packet wrapper module 508 is "lossless"; however, various different compression algorithms are possible and included within the scope of the present invention.

Packets sit in the Ethernet queue 510 waiting for bus transmission. Once a flow control circuit 512 determines that the client system 302 has sufficient buffer space to accept a packet from the queue 510, the packet is sent on the Ethernet bus or network 304 via the Ethernet Media Access Control (MAC) interface 513. However, the packet remains in the queue 510 until it is acknowledged (also referred to as "acked") by the client system 302 as having been received uncorrupted. The "ack" packets from the client system 302 are received via the Ethernet bus or network 304. If an "ack" packet is not received after a predetermined amount of time, the corresponding Ethernet packet is assumed to be lost and will be re-transmitted by the flow control circuit 512.

Note that the client system 302 may also re-request a packet (by sending a "nack" packet to the server system 300) if the packet is corrupted upon arrival at the client system 302.

A congestion avoidance module 526 interfaces between the Ethernet queue 510 and the Ethernet MAC interface 513. This congestion avoidance module 526 is operative to slow or even stall Ethernet transmission based on network congestion information. In a specific, non-limiting example, the congestion avoidance module 526 implements a congestion avoidance algorithm that is designed to artificially reduce the available Ethernet bandwidth, thereby slowing down Ethernet transmission by the Ethernet queue 510.

All Ethernet packets received from the Ethernet bus 304 via the Ethernet MAC interface 513 are passed to the Ethernet packet analyzer 514 and then directed to the correct module of the server controller 310 by the packet wrapper manager 516. In the case of "ack" or "nack" packets, they are re-directed to the flow control circuit 512, which will update the Ethernet queue 510 accordingly. For other Ethernet packets, if they are verified by the Ethernet packet analyzer 514 to be valid, they will be forwarded to a re-order queue 518, otherwise they are dropped. Since packets sent over the Ethernet bus or network 304 can arrive out-of-order at their destination, the re-order queue 518 is operative to put the packets back in their original order, thus making sure that their eventual destination (the system CPU 306) sees the same relative order that was assigned by the client controller 324 of the client system 302.

Note that a protocol module 524 implements various configuration, communications, networking and control protocols required for transmission of data over the Ethernet, the Internet and other such networks. Examples of such protocols include the Dynamic Host Configuration Protocol (DHCP), the Address Resolution Protocol (ARP), the Internet Group Management Protocol (IGMP) and the Internet Control Message Protocol (ICMP), among other possibilities. Thus, the protocol module 524 may, for example, auto-configure the server controller 310 for communication over the Ethernet bus 304, send error messages over the Ethernet bus 304 (via the Ethernet MAC interface 513) and/or determine a network machine's hardware address, among many other possibilities.

After re-ordering of the Ethernet packets by the re-order queue 518, a packet unwrapper module 520 is operative to "unpack" the Ethernet packets, by extracting the PCIe packets from each Ethernet packet (or frame). The packet unwrapper module 520 may apply some form of decompression to the received Ethernet packets, before extracting the PCIe packets. Although various different decompression algorithms are possible, the particular decompression algorithm implemented by the packet unwrapper module 520 is dependent on and compatible with the compression algorithm implemented by the packet wrapper module 508. Basically, the operation of the packet unwrapper module 520 is the inverse of that of the packet wrapper module 508. The extracted PCIe packets are sent to the upstream arbiter 502 for PCIe transmission to the CPU 306.

Note that the upstream arbiter 502 may implement a write pacing mechanism in order to ensure proper synchronization between the server GPU 308 and the client GPU 322. This write pacing mechanism includes stalling writes incoming from the PCIe interface 500 in order to match the number of writes coming from the Ethernet MAC interface 513.

Optionally, the server controller 310 may include a memory interface 522 if the server controller 310 is using an external memory (not shown) to store Ethernet packets destined for bus transmission. The use of such an external memory by the server controller 310 may be necessary if the required size of the Ethernet queue 510 becomes too large (i.e. too expensive) to fit in internal memory of the server controller 310. The required size of the Ethernet queue 510 is dictated by the latency of the data communication medium (e.g. Ethernet network 304); therefore, the use of an external memory may allow the server controller 310 to support very high latency, without the need for a large and expensive Ethernet queue 510.

Figure 6:
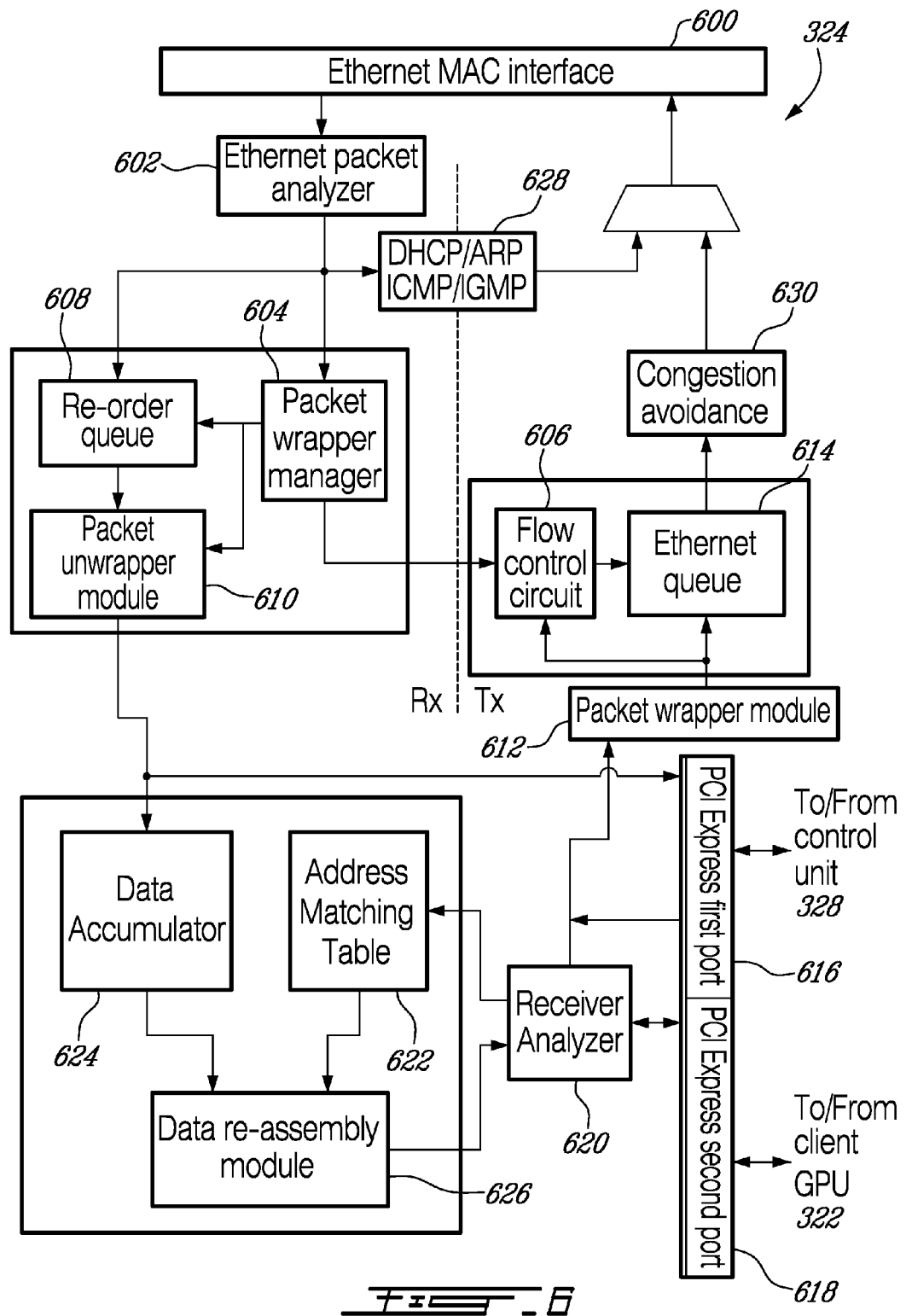
FIG. 6 is a schematic representation of the client controller shown in FIG. 3, according to a non-limiting example of implementation of the present invention.

FIG. 6 is a simplified block diagram of the client controller 324 of the client system 302, according to a non-limiting example of implementation of the present invention. The Ethernet transmission/reception path of the client controller 324 is identical in structure and functionality to that of the server controller 310. More specifically, upon reception of Ethernet packets via the Ethernet MAC interface 600, the packets pass from the Ethernet packet analyzer 602 to the packet wrapper manager 604, the latter re-directing the packets to either the flow control circuit 606 or the re-order queue 608 and packet unwrapper module 610. When the client controller 324 is transmitting Ethernet packets over the Ethernet bus or network 304, the packet wrapper module 612 passes the "packed" packets (i.e. a plurality of PCIe packets are packed into an Ethernet packet or frame) to the Ethernet queue 614, which is controlled by the flow control circuit 606 to release Ethernet packets to the Ethernet MAC interface 600 via the congestion avoidance module 630. The protocol module 628 of the client controller 324 implements various configuration, communications, networking and control protocols required for transmission of data over the Ethernet, as discussed above with regard to protocol module 524 of the server controller 310.

A first PCIe port 616 connects the client controller 324 to the control unit 328 of the client system 302. All incoming PCIe packets received by the port 616 (from the control unit 328) are forwarded to the packet wrapper module 612, which is the beginning of the Ethernet transmission path. All PCIe packets output by the packet unwrapper module 610 that are destined for the control unit 328 are forwarded unmodified to the port 616.

A second PCIe port 618 connects the client controller 324 to the client GPU 322 of the client system 302. Data requests (or read commands) received at the port 618 from the client GPU 322, which are destined for the system CPU 306, are intercepted by a receiver analyzer 620 and stored in an address matching table 622. Other commands received at the port 618, such as write commands and interrupts, are forwarded by the receiver analyzer 620 to the packet wrapper module 612 for Ethernet transmission.

When PCIe packets output by the packet unwrapper module 610 correspond to data sent by the system CPU 306 in response to data requests made by the server GPU 308 or the client GPU 322, these packets (also referred to as CPL packets) are intercepted and stored in a dedicated queue, also referred to as a data accumulator 624. When data is present in both the address matching table 622 and the data accumulator 624, a data re-assembly module 626 attempts to match read commands by the client GPU 322 stored in the address matching table 622 with the corresponding data packets stored in the data accumulator 624. When a match is identified for a particular read command, the data re-assembly module 626 builds the corresponding data packet (which may require combining several data packets together) and transfers the data packet to the port 618 via the receiver analyzer 620, for transmission to the client GPU 322.

The various components and modules of the systems discussed hereinabove may all be implemented in software, hardware, firmware or any combination thereof, within one piece of equipment or split up among various different pieces of equipment. Obviously, various different software, hardware and/or firmware based implementations of the techniques of the present invention are possible and included within the scope of the present invention.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A system for displaying graphics on a display of a second module remotely connected with a first module via a data communications medium, said system comprising:
   a) a first controller for the first module, said first controller adapted to be connected to a first graphics processor, the first graphics processor operative to request data from the first module when ready to process data, said first controller operative to interface between the first graphics processor and the first module; and
   b) a second controller for the second module, said second controller adapted to be connected to a second graphics processor, the second graphics processor operative to request data from the first module when ready to process data, said second controller operative to interface between the second graphics processor and the first module via the data communications medium and said first controller;
   c) said first controller operative to duplicate data returned to the first graphics processor by the first module in response to data requests, and to transmit the duplicated data to said second controller via the data communications medium;

d) said second controller operative to intercept data requests made by the second graphics processor and to correlate the intercepted data requests with the duplicated data received from said first controller, said second controller returning the duplicated data to the second graphics processor on a basis of said correlation, the second graphics processor using the duplicated data received from said second controller to generate graphics for display on the display of the second module.

2. A system as defined in claim 1, wherein said data requested of the first module by the first and second graphics processors includes graphics commands.

3. A system as defined in claim 1, wherein the first and second graphics processors are identically initialized before they begin making data requests of the first module.

4. A system as defined in claim 1, wherein the data communications medium is a wired network connection, the first module being a server module, the second module being a client module.

5. A system as defined in claim 4, wherein the wired network connection is an Ethernet network.

6. A system as defined in claim 1, wherein the first module includes a processing unit capable to generate said data and to store said data in a memory, the processing unit of the first module being a CPU, the memory for storing said data being a system memory of the first module.

7. A system as defined in claim 1, wherein the first module includes the first graphics processor and the second module includes the second graphics processor.

8. A system as defined in claim 1, wherein the first module includes said first controller and the second module includes said second controller.

9. A system as defined in claim 1, wherein said first controller and the first graphics processor are components of a first sub-module, the first sub-module being external to and connected to the first module.

10. A system as defined in claim 1, wherein said second controller and the second graphics processor are components of a second sub-module, the second sub-module being external to and connected to the second module.

* * * * *